United States Patent Office 2,821,530
Patented Jan. 28, 1958

2,821,530

TETRAHALOGEN SUBSTITUTED QUINACRIDONES

William S. Struve, Chatham, N. J., assignor to E. I. du Pont de Nemours and Company, Wilmington, Del., a corporation of Delaware No Drawing. Application January 4, 1956
Serial No. 557,245

11 Claims. (Cl. 260—279)

This invention relates to the preparation of new colored pigments comprising symmetrical tetrahalogen substituted linear quinacridones.

In my co-pending application, Serial No. 523,922, filed July 22, 1955, there is disclosed the method of preparing linear quinacridones of the following structural formula:

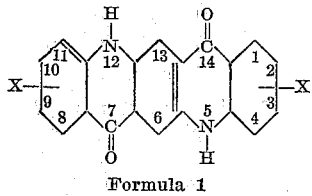

Formula 1 where X may be hydrogen, methyl, methoxy or halogen. The basic compound of the above formula contains X as hydrogen, and this compound may also be correctly named quin-(2,3-b)-acridone-7,14(5,12)-dione. The products of the above mentioned application are suitable in the manufacture of pigments which vary from rather bright reds to deep violets in hue.

It has now been found that symmetrical tetrahalogen substituted linear quinacridones may be prepared having the following structural formula:

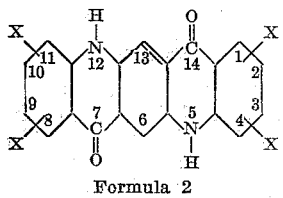

Formula 2 where X is selected from the group consisting of chlorine, bromine, fluorine and iodine. As can be readily seen, the above formula is linear in structure, and the term, quinacridone or dihydro-quinacridone, as used in the ensuing description and claims refers to this linear structure. It is also pointed out that the two halogens on each of the end rings are so posiitoned as to form a symmetrical molecule. The compounds of this structure have been found to be useful as pigments exhibiting a yellower shade than the compounds of my above-mentioned co-pending application.

It is an object of this invention to provide a novel process for preparing a new and useful class of compounds known as symmetrical tetrahalogen substituted linear quinacridones. It is a further object to provide a novel process for preparing a new and useful class of compounds known as symmetrical tetrahalogen substituted linear dihydroquinacridones. It is a still further object of this invention to provide symmetrical tetrahalogen substituted linear quinacridone pigments ranging in the hue from orange to yellowish red, and possessing a high degree of brightness, lightfastness, durability and freedom from bleed in solvents and chemical reagents.

These and other objects of this invention are accomplished by condensing under non-oxidizing conditions, such as a nitrogen atmosphere, a dialkyl succinyl succinate with an excess of a dihaloaniline in the presence of an acid catalyst. Various solvents may be used for this condensation. Denatured ethyl alcohol is preferred because it is readily available and relatively economical. After the condensation step, the reaction mixture is neutralized, and the condensed product recovered. The compound resulting from this condensation is a dialkyl tetrahalo-2,5,-dianilino-3,6-dihydroterephthalate which may be represented by the following structural formula:

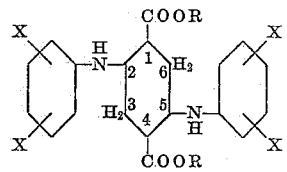

Formula 3 where R is an alkyl group and X is a halogen. Cyclization of the above compound to the compound shown in Formula 4 is then brought about by heating it in a high boiling solvent, such as a eutectic mixture of 23.5% by weight of biphenyl and 76.5% by weight of diphenyl oxide. This pyrolysis proceeds most readily near the boiling point of the eutectic mixture, and it should be carried out under a non-oxidizing atmosphere such as a blanket of nitrogen. Alcohol is a by-product since the ester splits, and the RO group takes on a hydrogen liberated by the formation of the new rings. The compound recovered from the cyclization reaction is a tetrahalo-6,13-dihydro-quinacridone which is represented by the following structural formula:

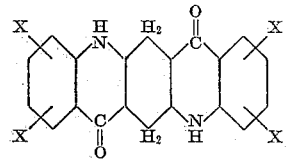

Formula 4 where X is a halogen.

The above compound is then oxidized with a mild oxidizing agent thereby removing a hydrogen atom from both the 6 and 13 positions to form a linear tetrahaloquinacridone as shown in Formula 2.

The final products obtained by the above-described process are highly colored, and they are suitable as pigments. For this purpose a small particle size is contemplated and tetrahalogen substituted quinacridones having a surface area greater than about 60 square meters per gram (as measured by the nitrogen absorption method of Emmett described in "Advances in Colloid Science," vol. 1, 1942) will be found suitable.

The tetrahalogen substituted dihydro-quinacridones and quinacridones of this invention may be represented by the following structural formula:

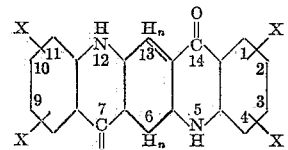

Formula 5 where $n$ is an integer of from 1 to 2 and X is a halogen selected from the group consisting of chlorine, fluorine, bromine, and iodine. If $n$ is 1, the structure represents quinacridone, and as will be seen from Formula 2, it is not customary to show the single hydrogen attached to the ring when depicting the specific formula for this compound. It should also be noted that the compounds of this invention are symmetrical with respect to the position of the halogen atoms on the end rings.

In the preferred embodiment of this invention, 2,4-dichloroaniline is condensed with diethyl succinyl succinate by refluxing in ethyl alcohol in the presence of a small amount of the corresponding aniline hydrochloride as a catalyst. A large excess of 2,4-dichloroaniline is used and the operation is carried out under a blanket of an inert gas, such as nitrogen. After the condensation step is concluded, the reaction mixture is neutralized and the condensed ester is recovered. The compound resulting from this condensation is diethyl tetrachloro-2,5-dianilino-3,6-dihydroterephthalate and cyclization of this compound is then brought about by heating it in a high boiling solvent such as "Dowtherm A" (eutectic mixture of 23.5% by weight of biphenyl and 76.5% by weight of diphenyl oxide). This pyrolysis proceeds most readily near the boiling point of the "Dowtherm A" and should also be carried out under a blanket of an inert gas; e. g., nitrogen. After the heating, 2,4,9,11-tetrachloro-6,13-dihydroquinacridone is recovered from the "Dowtherm A," and it is oxidized to the quinacridone compound by reacting with a mild oxidizing agent such as sodium m-nitrobenzenesulfonate in an alkaline alcoholic medium at a temperature in the general vicinity of 100° C.

Other tetrachloroquinacridones may be similarly prepared, and the following table gives the compounds which are formed from the various isomers of dichloroaniline.

TABLE I

| Dichloroanilines | Tetrachloroquinacridone Compounds |
| --- | --- |
| 2,3-dichloroaniline | 3,4,10,11-tetrachloroquinacridone. |
| 2,4-dichloroaniline | 2,4,9,11-tetrachloroquinacridone. |
| 2,5-dichloroaniline | 1,4,8,11-tetrachloroquinacridone. |
| 3,4-dichloroaniline | 2,3,9,10-tetrachloroquinacridone. |
| Do | 1,2,8,9-tetrachloroquinacridone. |
| 3,5-dichloroaniline | 1,3,8,10-tetrachloroquinacridone. |

The compounds, 2,4-dichloroaniline, 2,5-dichloroaniline, and 3,4-dichloroaniline, are the most readily available of the dichloroanilines, and from a practical point of view the tetrahaloquinacridones obtained therefrom may be preferred. As will be seen from the description which follows, the analogous dibromo, difluoro and diiodo anilines may be used to prepare their corresponding tetrahalogen substituted quinacridones.

The following examples illustrate this invention in more detail.

*Example I*

A mixture of 200 parts of 2,4-dichloroaniline, 149 parts of diethyl succinyl succinate, 20 parts of 5 N HCl, and 2,900 parts of denatured ethyl alcohol (Formula 2B—denatured with benzene, Lange's "Handbook of Chemistry," 6th ed. (1946)) was heated with stirring under reflux (about 80° C.) in an atmosphere of nitrogen for about nine hours. 50 parts of a 2 N solution of sodium carbonate was then added, and the mixture was cooled to approximately room temperature with stirring. It was then filtered and the product was washed with alcohol and dried giving 261 parts of diethyl 2',4',2'',4''-tetrachloro-2,5-dianilino-3,6-dihydroterephthalate which is assigned the following formula:

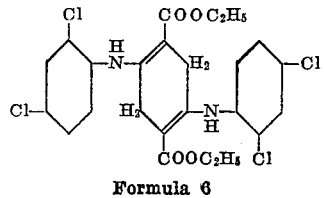

Formula 6

It is possible to have tautomerism in this type of compound with the double bond of the center ring shifting and the hydrogen on the nitrogen atoms becoming attached to said ring. However, the above formula is considered to be the correct method of illustrating the compound structure of the terephthalate intermediate of this invention.

45 parts of the above dianilino ester is then added to 450 parts of "Dowtherm A" (a mixture of 23.5% by weight of biphenyl and 76.5% by weight of diphenyl oxide) and the mixture is heated at the boiling point of the "Dowtherm A" for about 1½ hours under an atmosphere of nitrogen. The resulting slurry is cooled with agitation to about room temperature. It is then filtered, and the cake is washed with alcohol until substantially free of "Dowtherm A." After drying, there is obtained 27 parts of 2,4,9,11-tetrachloro-6,13-dihydroquinacridone of the following formula:

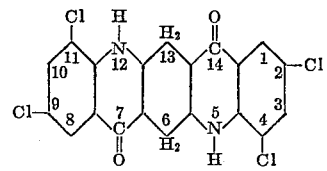

Formula 7

190.5 parts of this tetrachlorodihydro-quinacridone, 3,900 parts of ethylene glycol, 500 parts of 30% sodium hydroxide solution and 190.5 parts of sodium m-nitrobenzenesulfonate are mixed and heated with agitation at 120° C. for about 5 hours. The resulting slurry is diluted with 1,500 parts of cold water, and the solid is separated by filtration, washed alkali free with water, and dried to give an orange colored powder of the following formula:

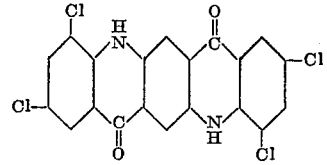

Formula 8

The product is purified by dissolving it in ten parts of 100% sulfuric acid, and then precipitating it by diluting the resulting solution with water to 85% sulfuric acid. The precipitate is filtered off and washed acid free with water, thus giving the orange colored material in a purified and highly crystalline form.

To have utility as a pigment, it is necessary that the tetrachloroquinacridone obtained above be converted to a small particle size. As one effective means of accomplishing this end, ten parts of the tetrachloroquinacridone is mixed with 180 parts of salt and two parts of xylene and ground in a ball mill for about 72 hours. After separating the resulting orange colored powder from the grinding balls, it is extracted with a dilute (about 5%) sulfuric acid solution at the boil, filtered, washed acid-free and dried to give a bright orange pigment of excellent light-fastness and free from any tendency to bleed in water, organic solvents, dilute acid or dilute alkalies.

This pigment dissolves in concentrated sulfuric acid to give a deep violet solution from which the original orange pigment is reprecipitated on drowning in a large volume of water.

*Example II*

A mixture of 25.6 parts of diethyl succinyl succinate, 48.6 parts of 3,4-dichloroaniline, 560 parts of denatured alcohol (Formula 2B) and 6 parts of 5 N HCl is heated with agitation to the boil and maintained under reflux conditions for about two hours during which an atmosphere of nitrogen is maintained in the flask. 15 parts of a 2 N solution of sodium carbonate is then added, and the flask cooled to about room temperature, and the solid isolated by filtration, washing with alcohol, and drying to give 54 parts of the dianilino compound which is assigned the following structural formula:

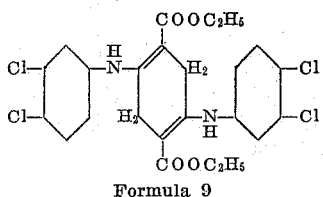

Formula 9

45 parts of this dianilino compound is mixed with 450 parts of "Dowtherm A" and heated at the boiling point of "Dowtherm A" in an atmosphere of nitrogen for 1½ hours and then cooled to about room temperature. The solid is filtered off, washed with alcohol until substantially free of "Dowtherm A" and then dried giving 25.5 parts of 2,3,9,10-tetrachloro-6,13-dihydro-quinacridone of the following structural formula:

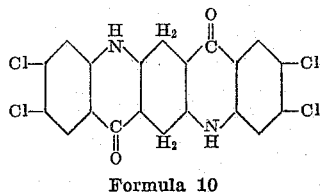

Formula 10

25 parts of this tetrachlorodihydro-quinacridone, mixed with 480 parts of alcohol (Formula 2B), 67 parts of 30% sodium hydroxide solution and 25 parts of sodium m-nitrobenzenesulfonate, is heated to the boil with agitation for about 4 hours. The solid is then filtered off, washed free of alkali and dried to give a red solid having the following structural formula:

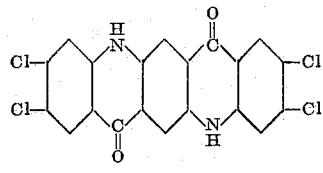

Formula 11

As will be seen from Table I, 3,4-dichloroaniline can form two different tetrachloroquinacridones. The quinacridone shown in the above formula is the one that is believed to predominate in the end product of the process. However, it is possible that the end product could contain some 1,2,8,9-tetrachloroquinacridone.

When dissolved in concentrated sulfuric acid, a violet solution results. The original red colored material may be reprecipitated on drowning the solution with water. By selecting the proper concentration the colored material will precipitate before the impurities (this is usually about 85% sulfuric acid), and it is possible to use this method to purify the product.

To obtain the material in a suitable particle size for use as a pigment, it may be salt milled as described in Example I to give a brilliant yellowish-red pigment of excellent properties with respect to color, lightfastness, and freedom from bleed in various solvents and chemical agents to which it might be exposed.

*Example III*

If 2,5-dichloroaniline is used in the process described in Example I above, the resulting product after salt milling is a brilliant yellowish-red pigment comprising 1,4,8,11-tetrachloroquinacridone.

*Example IV*

The following table summarizes the results obtained by the use of other dichloroanilines and by the use of various dibromo and difluoro anilines in a process like that of Example I.

TABLE II

| Aniline Derivative | Quinacridone | Color |
|---|---|---|
| 2,3-dichloroaniline | 3,4,10,11-tetrachloroquinacridone | Orange-Red. |
| 3,5-dichloroaniline | 1,3,8,10-tetrachloroquinacridone | Do. |
| 2,4-dibromoaniline | 2,4,9,11-tetrabromoquinacridone | Orange. |
| 3,4-dibromoaniline | 2,3,9,10-tetrabromoquinacridone | Red. |
| 2,5-dibromoaniline | 1,4,8,11-tetrabromoquinacridone | Orange. |
| 2,4-difluoroaniline | 2,4,9,11-tetrafluoroquinacridone | Do. |
| 2,5-difluoroaniline | 1,4,8,11-tetrafluoroquinacridone | Do. |
| 2,4-diiodoaniline | 2,4,9,11-tetraiodoquinacridone | Do. |

The condensation of dihaloaniline derivatives, such as dichloroaniline, with succinyl succinic ester is acid catalyzed. The catalyst is in effect a salt of the aniline derivative which is used in the reaction, and it is effectively formed in situ by the addition of a small amount of acid; e. g., HCl, which forms a soluble salt. Other examples of materials suitable for forming the catalyst include HBr, HI, $HNO_3$ and $CH_3COOH$.

The examples show the use of ethyl alcohol as a solvent for the condensation. This makes it easy to subsequently filter the end product from the solution, and also to further wash with alcohol to effectively remove the unreacted dihaloaniline from the mixture. The amount of solvent is not critical so long as it keeps the materials in solution. A preferred amount is from 10 to 40 times the weight of the succinyl succinic ester. It is also possible and might even be preferred to carry out the condensation in the presence of a high boiling solvent of the type which might be used to continue the ring closure step. This would eliminate the isolation of the terephthalate ester (see Formula 3) formed in the condensation reaction. With this procedure, however, it would be necessary to remove the excess aniline derivative before the cyclization step. This could be done by such means as vacuum distillation.

The preferred temperature of the condensation reaction is about 80° C. and it is effective within the range of about 60° to 110° C. At the preferred temperature the optimum time of reaction is about 2 hours. This may be varied within the range of about 1 to 6 hours.

The neutralization step subsequent to the completion of the condensation is advantageous to minimize oxidation of the tetrahaloanilino-terephthalate compound which has been formed. The alkali metal and the alkaline earth metal bicarbonates are the type of neutralizing agents which are especially suitable. For example, it is convenient to use sodium bicarbonate or potassium bicarbonate, monosodium phosphate or monocalcium phosphate as a slurry in a small amount of water.

While the examples have been concerned with the use of diethyl succinyl succinate it should be understood that corresponding methyl and propyl esters can be used. However, if other esters are used, one should use the corresponding alcohol as a solvent in order to prevent any ester interchange.

The examples show the use of nitrogen to maintain a non-oxidizing atmosphere. However, the only requirement of the gas used is that it be inert and free from oxygen. Thus, carbon dioxide could be used if sufficiently pure as well as argon, helium or other inert gases. Nitrogen is preferred because it is readily available at a low cost in a pure form, but it is not intended to exclude the use of other gases which would form a shielding atmosphere.

The cyclization of the dianilino compound to the dihydro-quinacridone is conveniently carried out as shown in the examples at the boiling temperature of "Dowtherm A." On the other hand, many other inert liquids of a suitably high boiling point may be used with equal facility. Examples of such materials include α methyl naphthalene, β methyl naphthalene, biphenyl, diphenyl oxide and mineral oils boiling above about 250° C. and mixtures of these liquids. The preferred boiling range for the inert liquid is from about 240-300° C. In general, the temperature of the pyrolysis step should be between about 240 and about 260° C., and the time may vary from about 45 minutes to about three hours.

The oxidation of the dihydro-quinacridone to quinacridone is conveniently carried out with a mild oxidizing agent such as a sulfonated nitrobenzene derivative in the presence of an alkaline alcoholic medium. The examples show the use of a sodium hydroxide solution in ethylene glycol or ethanol, but other alcoholic solvents such as methanol, normal propanol, and the various monoethers of ethylene glycol may be used with suitable modifications of the process. In general, it is preferred that the reaction be carried out under alkaline conditions, but the choice of solvent and the choice of agent is not critical. It is possible to carry out the oxidation by simply stirring while bubbling air through the mixture in which the tetrahalodihydro-quinacridone is produced, or a suitable oxidizing mixture may be introduced at this point. Oxidation is evident from the marked change in color which accompanies the reaction.

The tetrahalogen substituted quinacridones of this invention are pigments of great value showing a brilliant orange to yellowish-red color and a very high resistance to fading on exposure to the elements. They also exhibit complete insolubility in the usual solvents of coating compositions and the like, as well as insolubility in the ordinary acids and alkalies to which compositions made from these pigments might be exposed in the normal expected uses. In this range of orange to yellowish-red pigments, there has been a notable lack of products exhibiting high lightfastness and durability in coating compositions. For this reason, the products of this invention are considered to be capable of filling a long felt need in the pigment industry.

I claim:

1. A new composition of matter comprising a quinacridone selected from the group consisting of symmetrical tetrahalo substituted dihydro-quinacridones and symmetrical tetrahalo substituted linear quinacridones of the following structural formula:

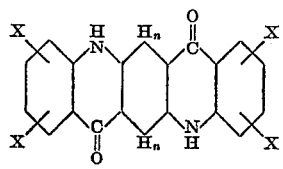

where both $n$'s are the same whole number of from 1 to 2 and X is a halogen selected from the group consisting of fluorine, chlorine, bromine, and iodine, and the substituents X are symmetrical with respect to their positions on the end rings.

2. The composition of claim 1 in which $n$ is 2.
3. The composition of claim 2 in which X is chlorine.
4. A new composition of matter comprising a symmetrical tetrahalo substituted quinacridone of the following structural formula:

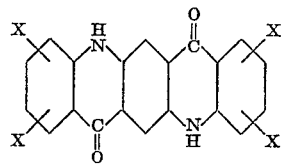

where X is a halogen from the group consisting of fluorine, chlorine, bromine, and iodine and the substituents X are symmetrical with respect to their positions on the end rings.

5. The composition of claim 4 in which X is chlorine.
6. 2,4,9,11-tetrachloroquinacridone.
7. 2,3,9,10-tetrachloroquinacridone.
8. 1,4,8,11-tetrachloroquinacridone.
9. 2,4,9,11-tetrabromoquinacridone.
10. A process for preparing a symmetrical tetrahalo substituted linear quinacridone which comprises heating under non-oxidizing conditions a dialkyl tetrahalo-2,5-dianilino-3,6-dihydroterephthalate, having from 1–3 carbon atoms in the alkyl groups, in an inert high boiling liquid at temperatures ranging from about 240–260° C. thereby obtaining a tetrahalo substituted linear dihydro-quinacridone, separating said dihydro-quinacridone from the reaction mixture and oxidizing the latter compound with a mild oxidizing agent to a tetrahaloquinacridone, said oxidizing agent being selected from the group consisting of nitrobenzene-m-sodium sulfonate and oxygen.
11. The process of claim 10 in which the dialkyl tetrahalo-2,5-dianilino-3,6-dihydroterephthalate is a dialkyl tetrachloro-2,5-dianilino-3,6-dihydroterephthalate, and the high boiling solvent is a mixture of 23.5% by weight of biphenyl and 76.5% diphenyl oxide.

References Cited in the file of this patent

UNITED STATES PATENTS 2,054,100   Scott et al. _____ Sept. 15, 1936

OTHER REFERENCES

Liebermann: Annalen, v. 518, pages 245–59.